United States Patent [19]

Iwasaki

[11] Patent Number: 4,712,034
[45] Date of Patent: Dec. 8, 1987

[54] MULTIPLE RING ARMATURE CORE FOR DIRECT CURRENT MOTOR

[75] Inventor: Shinichiro Iwasaki, Troy, Mich.

[73] Assignee: Aisin Seiki Kabushiki Kaisha, Japan

[21] Appl. No.: 797,036

[22] Filed: Nov. 12, 1985

Related U.S. Application Data

[63] Continuation-in-part of Ser. No. 595,483, Mar. 30, 1984, Pat. No. 4,553,058.

[51] Int. Cl.⁴ .............................................. H02K 15/02
[52] U.S. Cl. ...................................... 310/217; 310/216
[58] Field of Search ...................... 310/43, 44, 45, 65, 310/178, 208, 216, 268, 217, 218

[56] References Cited

U.S. PATENT DOCUMENTS

| | | | |
|---|---|---|---|
| 2,221,983 | 11/1940 | Mayer et al. | 310/44 |
| 2,542,048 | 2/1951 | Nagel | 310/217 |
| 2,883,566 | 4/1959 | Briggs | 310/217 |
| 3,213,302 | 10/1965 | Barney | 310/216 |
| 3,222,626 | 12/1965 | Feinberg et al. | 310/217 |
| 3,239,705 | 3/1966 | Kavanaugh | 310/268 |
| 3,315,106 | 4/1967 | Reynst | 310/268 |
| 3,801,392 | 4/1974 | Scheel et al. | 310/217 |
| 4,132,910 | 1/1979 | Kiss et al. | 310/44 |
| 4,471,247 | 9/1984 | Cotton | 310/45 |
| 4,546,282 | 10/1985 | Hartwig | 310/218 |

*Primary Examiner*—Peter S. Wong
*Assistant Examiner*—D. L. Rebsch
*Attorney, Agent, or Firm*—Banner, Birch, McKie & Beckett

[57] ABSTRACT

A multiple ring armature core for a low profile DC motor. In one embodiment of the invention, the armature core is constructed of a plurality of insulated metal sheets or disks. Each sheet is in turn constructed of a plurality of rings or washers interfitted together with an air gap therebetween. The air gap is filled with an insulating material and the armature core completely encapsulated to form a composite structure. In another embodiment of the invention, the armature core is constructed of a plurality of sheets where a first sheet is made of powdered iron and a second sheet is made of solid iron.

23 Claims, 28 Drawing Figures

REAR FACE

FRONT FACE

IRON POWDER CORE | SOLID IRON (PURE IRON) (SILICON STEEL) | IRON POWDER CORE

FIG. 27.

IRON POWDER CORE | LAMINATION OF SILICON STEEL | IRON POWDER CORE

FIG. 28.

MULTIPLE RING ARMATURE CORE FOR DIRECT CURRENT MOTOR

BACKGROUND OF THE INVENTION

This application is a continuation in part of commonly assigned application Ser. No. 595,483 filed Mar. 30, 1984, now U.S. Pat. No. 4,553,058.

The present invention relates generally to the field of electric motors, and more particularly, is directed to a multiple ring armature core for use with a low profile direct current electric motor.

Low profile or so-called "pancake" motors are used in a wide variety of applications. Many of these applications demand a motor tha is both small in size and is capable of delivering high output torque. For example, such motors are often installed in the door panels of automobiles for operating a power window system. In modern automobiles, however, door panels are becoming increasingly thinner. Thus, any devices installed in the door panel must be correspondingly thinner. Low profile motors known in the prior art that were at one time suitable for this application are fast becoming fewer in number.

One embodiment of a conventional low profile or pancake motor comprises a disk-shaped armature having so-called printed circuits. The printed circuits form a winding with a limited number of turns. Because the number of turns in each winding is limited, the magnetic flux generated by the windings is correspondingly low. Thus, the output torque of the motor is very small. Moreover, the limited number of turns in the windings result in a motor having a very low impedance. Thus, such motors are suitable only for low voltage operation. The armature of the motor also includes a hole for the motor shaft. Such a hole reduces the flux area of the armature and thus the available torque of the motor.

U.S. Pat. No. 3,315,106 issued in the name of Reynst discloses a pancake motor design which addresses some of the deficiencies in pancake motors known in the prior art. The Reynst motor comprises an armature having windings with a relatively large number of turns. The windings are wound through slots in the armature to increase the number of turns in each winding. Thus, the motor can produce more torque than motors known in the prior art. In the manufacture of such a motor, however, substantial time and care is required in placing the windings in the slots. Thus, mass production of motors of this design is not economical. Moreover, the armature has a relatively large hole for the motor shaft, thus reducing the flux area of the armature and its available torque.

SUMMARY OF THE INVENTION

It is the overall object of the present invention to provide a new and improved motor which overcomes the disadvantages of motors known in the prior art.

A specific object of the present invention is to provide a new and improved armature core for a motor which substantially reduces eddy current losses.

The low profile motor in accordance with the present invention comprises a disk-shaped armature of soft magnetic material. A plurality of windings are wound around the armature along its front and rear faces. In one embodiment of the invention, a small hole is provided in the center of the armature for receiving a shaft. In this embodiment, the turns in each winding extend across each armature face substantially adjacent, i.e., substantially contiguous, the center of the armature where the hole is located. No slots are provided in the armature for the windings to extend through as is known in the prior art nor do the windings extend through the small hole used to receive the armature shaft. Thus, the windings may be readily formed on the armature using very simple manufacturing techniques. The motor in accordance with the present invention further includes front and rear plates each having a pair of arc-shaped magnetic poles of opposite polarity forming field magnets and a centrally located hole for receiving the armature shaft. The plates are mounted on the shaft in spaced parallel position, with the armature therebetween, and arranged to provide a flow of magnetic flux perpendicular to the windings on the front and rear faces of the armature. The novel arrangement of the windings on the armature assure that a substantial number of the magnetic lines of flux generated by the motor field magnets cut across a substantial number of turns forming the armature windings along both the front and rear faces of the armature. A commutator is mounted on one end of the shaft to provide electrical power to the armature windings in cooperation with a pair of brushes.

In the low profile motor of the present invention, only the motor shaft is received in the hole formed in the armature. Thus, the hole need be formed no larger than the diameter of the shaft. It has been discovered that minimizing the size of the hole in the armature increases the flux area of the armature, which also increases the output torque of the motor. A corresponding benefit is that the motor can be made even smaller. Moreover, a large number of turns in each winding is possible since more surface area is available on the armature. Thus, a corresponding increase in motor torque is realized.

In some applications, the driving torque required by the driven device necessitates the use of a large motor shaft. A large shaft, however, requires a correspondingly large hole in the armature. Such a hole decreases the flux area of the armature and reduces the number of turns possible in each winding as pointed out above. The second embodiment of the present invention is ideally suited for those applications requiring a large motor shaft.

In the second embodiment of the present invention, the armature does not have a hole for receiving a shaft. The turns of each winding on the armature are wound over the center of the armature and extend directly across its front and rear faces. Thus, the windings for the armature in this embodiment may also be formed using simple manufacturing techniques. First and second shaft assemblies are connected to the armature windings at the center of each respective face of the armature. A resin enclosure is then molded over the entire armature assembly to form a composite unit, with shaft assemblies extending through each respective side of the enclosure. The molded enclosure provides added strength for the assembly. The shaft portion of each shaft assembly can thus be made to correspond in size to the required torque of the motor without deleteriously effecting the number of turns in the armature winding or the flux area of the armature.

This embodiment of the present invention also includes front and rear plates, each having a pair of arc-shaped magnetic poles of opposite polarity and a centrally located hole for receiving a respective armature shaft assembly. The plates are mounted on the shaft assemblies in spaced, parallel position and arranged to provide a flow of magnetic flux perpendicular to the front and rear faces of the armature. A commutator is also provided on one of the shaft assemblies to provide electrical power to the armature windings in cooperation with a set of brushes.

The low profile motor of the present invention also includes a novel armature core. The core comprises a plurality of laminated sheets which themselves are made up of a plurality of rings or washers. Each ring is coated with a thin resin insulating material. It has been found that this construction substantially reduces the eddy current losses in the armature and thereby increases the efficiency of the motor. Each ring is separated from its adjacent ring by a locating tab which maintains a space between the rings. This space is filled with resin material which serves to bind the rings together.

DESCRIPTION OF THE PREFERRED EMBODIMENT

Figures 1, 4, 5:
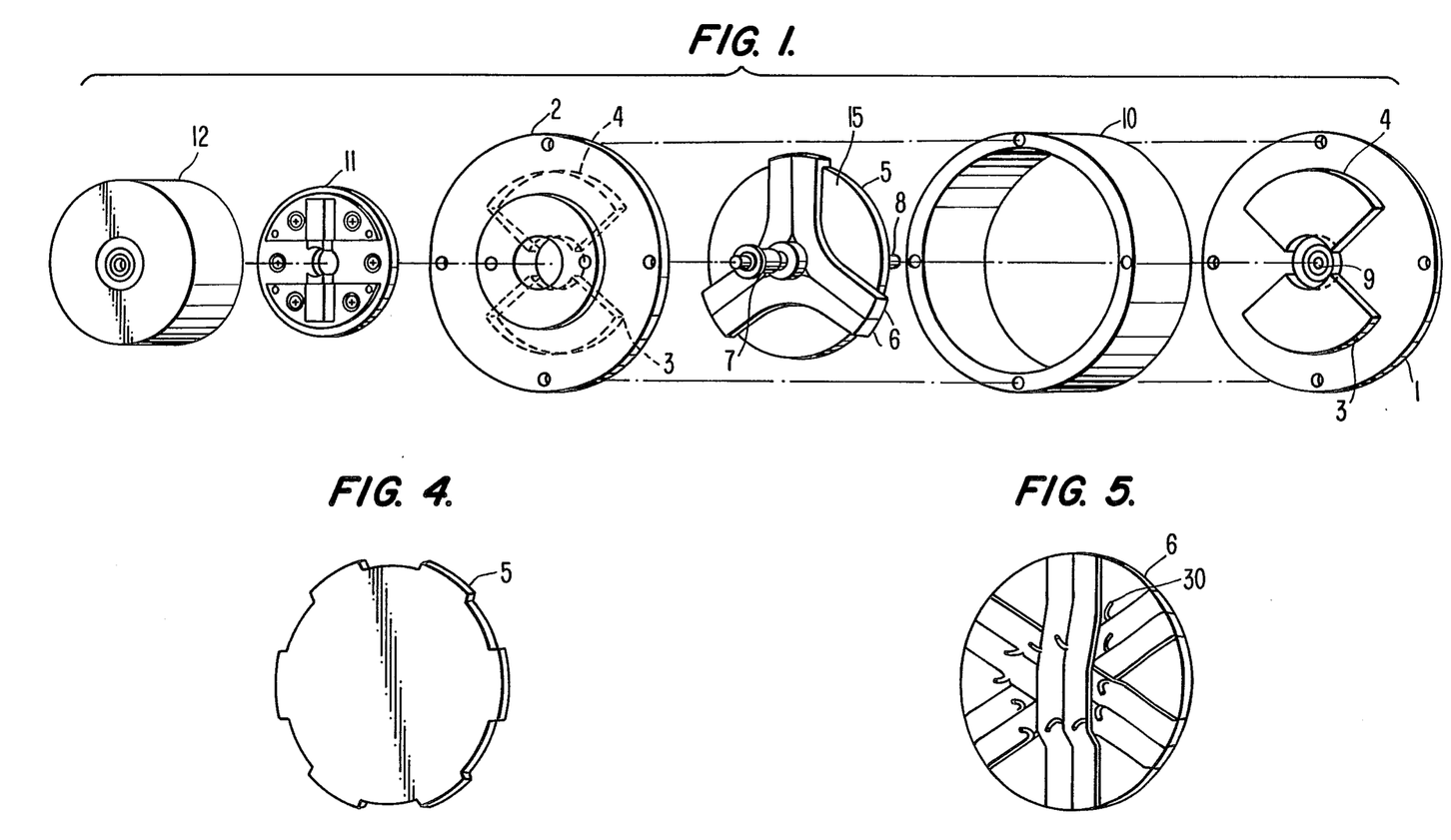
FIG. 1 is an assembly view of a motor in accordance with the present invention.
FIG. 4 is a perspective view of one embodiment of an armature having a slotted periphery in accordance with the present invention.
FIG. 5 is a perspective view of another embodiment of the armature and armature windings in accordance with the present invention.
Figure 2:
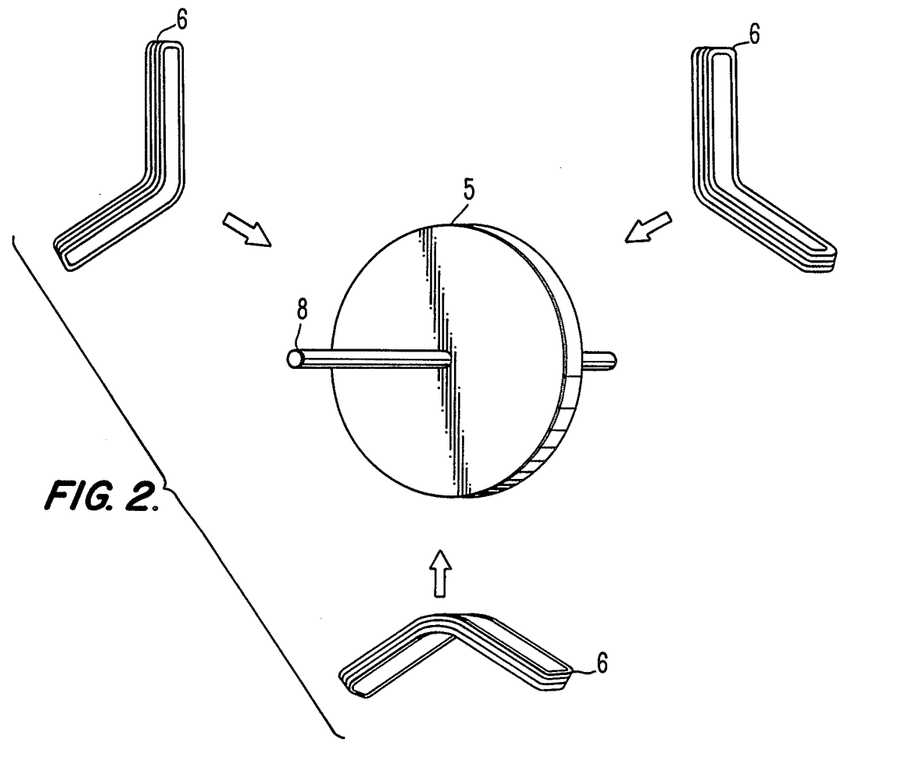
FIG. 2 is an assembly view illustrating the armature and armature windings of the motor shown in FIG. 1.

One embodiment of a motor in accordance with the present invention is shown in FIG. 1. This embodiment comprises a number of inter-related elements including disk-shaped armature 5 having a plurality of windings 6 and a shaft 8. Armature 5 is illustrated in additional detail in FIG. 2 where shaft 8 is shown located through a small hole formed in armature 5 and windings 6 are shown in their respective assembly positions along the faces of armature 5. With reference again to FIG. 1, windings 6 extend across front face 15 and rear face 16 of armature 5. Each turn of windings extends from one point on the periphery of the armature inwardly across a respective face to a point substantially adjacent, i.e., substantially contiguous, the center of the face and outwardly to another point on the periphery of the armature. Because the windings are formed along the front and rear faces of the armature, they are fully exposed and may be readily fabricated using relatively simple manufacturing techniques and production processes. The front and rear faces of the armature may comprise an equal number of windings. The arrangement of the windings in this manner maximizes the active portions of the armature which cut across the lines of magnetic flux generated by magnetic poles 3 and 4 described below. Thus, the amount of torque produced by the motor is maximized. As further shown in FIG. 1, this embodiment of the present invention also includes plates 1 and 2. Plates 1 and 2 each have a pair of arc-shaped magnetic poles forming a magnetic field and center hole 9 for receiving shaft 8. Plates 1 and 2 are mounted on shaft 8 in spaced parallel position, with armature 5 therebetween, and arranged to provide a flow of magnetic flux perpendicular to the front and rear faces of armature 5. Plates 1 and 2 are held in spaced parallel position by cover 10. Shaft 8 includes commutator 7 which extends through plate 20 to brush assembly 11. Brush assembly 11 and commutator 7 cooperate to selectively provide electrical power to windings 6 on armature 5. Housing 12 is provided as a cover for brush assembly 11.

FIG. 4 ilustrates an embodiment of armature 5 having a slotted periphery. The slots are provided for receiving windings 6. Thus, the diameter of the armature 5 may be reduced to provide even more compactness for the motor.

Figure 6:
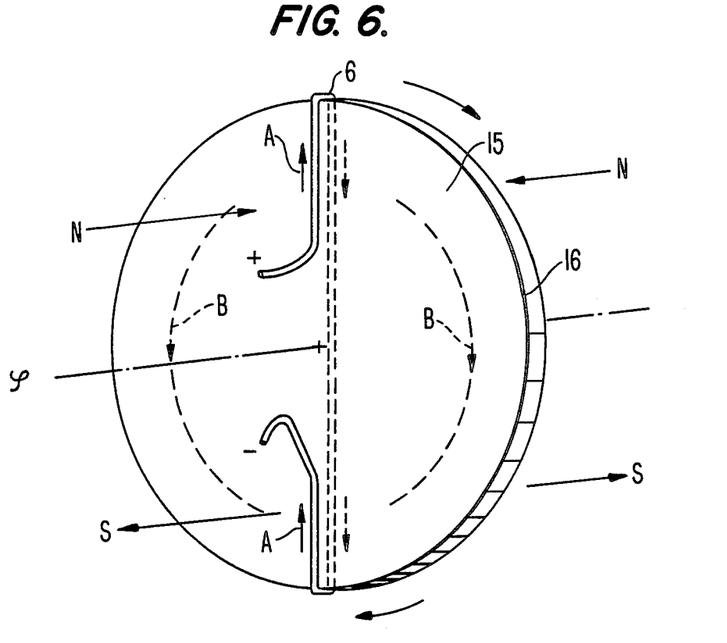
FIG. 6 is a diagram illustrating the flow of magnetic lines of flux across the armature windings.

FIG. 6 illustrates the flow of magnetic lines of flux from magnetic poles 3 and 4 mounted on plates 1 and 2. As shown in FIG. 6, the flow of the magnetic lines of flux is perpendicular to each respective face of armature 5. Thus, armature windings 6 cut across the maximum number of flux lines as armature 5 rotates. Thus, high torque can be produced by the motor.

Figure 7:
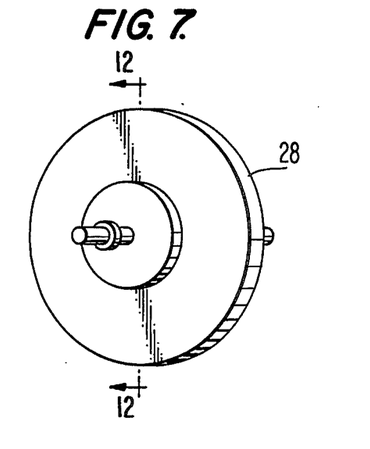
FIG. 7 is a perspective view illustrating an armature having a molded resin enclosure in accordance with the present invention.
Figure 8:
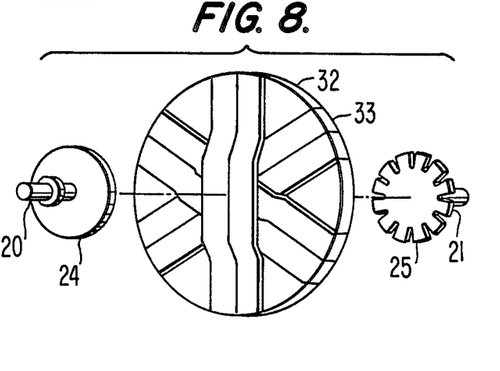
FIG. 8 is an assembly view illustrating an armature and armature windings and respective shaft assemblies in accodance with the present invention.
Figure 12:
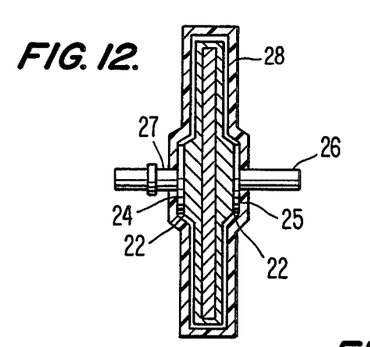
FIG. 12 is a section view along line 12—12 in FIG. 7.

FIGS. 7 and 8 illustrates an alternative construction for motor armature. In this embodiment, armature 32 does not have a hole for receiving a shaft. As shown in FIG. 8, armature 32 comprises a plurality of windings 33 wound across the center the armature. Shaft assemblies 20 and 21 are rigidly connected to the windings on each respective surface of armature 32 by an adhesive 22 as shown in FIG. 12. Enclosure 28 is then molded over the entire assembly. It is anticipated that enclosure 28 will be a high strength molding resin compound which provides additional shear strength for shaft assemblies 20 and 21. In this embodiment of the invention, windings 33 may also be readily wound on armature 32 because they are not formed through slots or holes in the armature.

As shown in FIG. 5, each winding 33 terminates in respective ends 30. These ends may be guided by wire guide 24 on shaft assembly 21 to a commutator, e.g., commutator 7 shown in FIG. 1.

Figure 3:
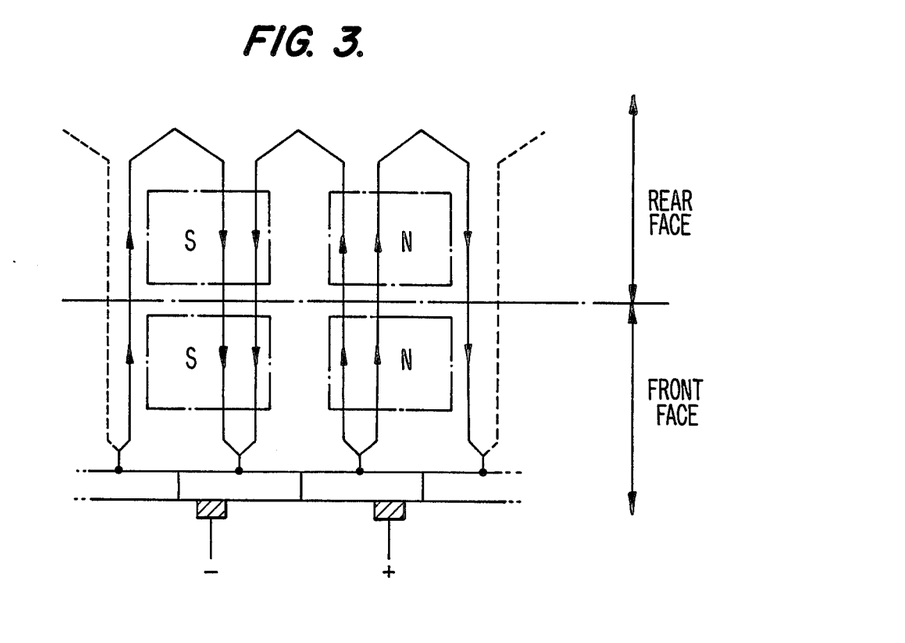
FIG. 3 is a wiring diagram illustrating one wiring scheme for the armature windings.
Figure 9:
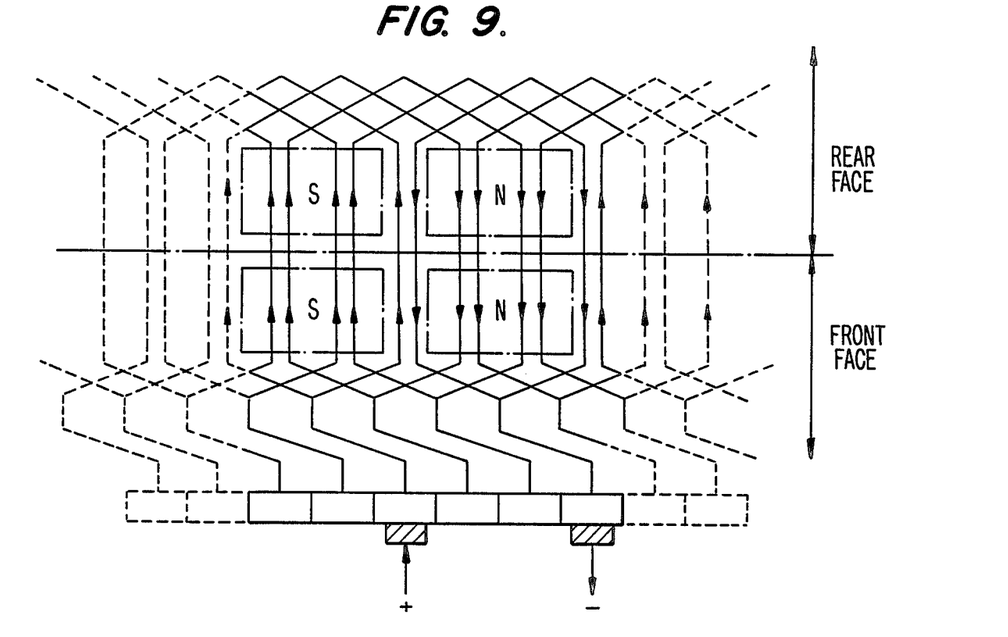
FIG. 9 is a wiring diagram illustrating another winding scheme for the armature windings.

FIGS. 3 and 9 illustrate various wiring schemes which may be used to connect the armature windings as known in the prior art. The choice of a particular wiring scheme is dependent on the application that the motor will be used for and the power source. The wiring scheme shown in FIG. 3 is particularly suited for the embodiment of the armature shown in FIGS. 1 and 2 and the wiring scheme shown in FIG. 9 is particularly suited for the embodiment shown in FIGS. 5 and 8.

Figure 10:
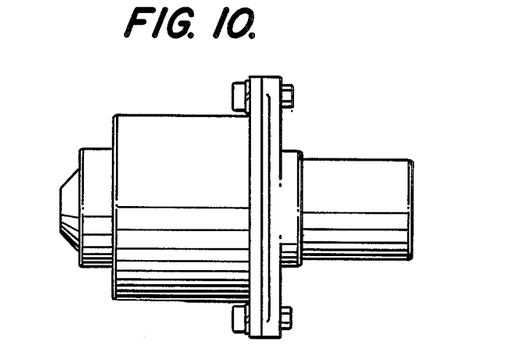
FIGS. 10 and 11 provide a comparison between the size of a prior art low profile motor shown in FIG. 11 and a much smaller low profile motor shown in FIG. 10 in accordance with the present invention and having the same torque.
Figure 11:
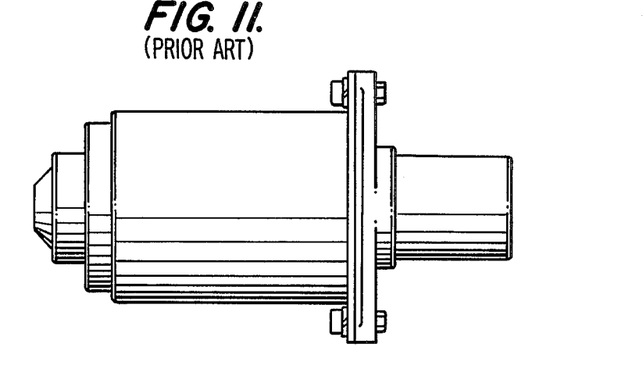

FIGS. 10 and 11 provide a size comparison between a low profile motor in accordance with the present invention as shown in FIG. 10 and a so-called low profile motor known in the prior art as shown in FIG. 11. Both motors produce the same lever of output torque.

Figure 13:
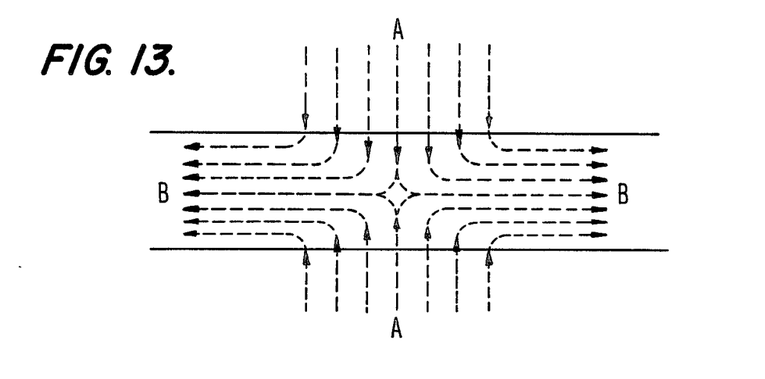
FIG. 13 illustrates the flow of magnetic flux in one embodiment of the armature core of the invention.

In the armature core for the low profile motor described above, there are two types of magnetic flux patterns as shown in FIGS. 6 and 13. One pattern is illustrated by arrows A which shows the flow of flux running perpendicular to the armature core plane. The other pattern is illustrated by arrows B which shows the flow of flux running circumferential around the armature core. As the core rotates, the amount of flux flow continuously changes, thereby creating eddy current losses. In conventional motors, it is very difficult to minimize eddy current losses using known techniques due to the construction of the core.

Figure 14:
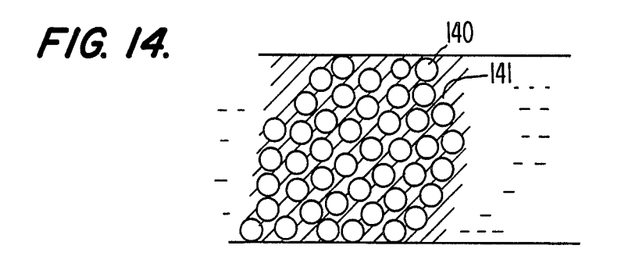
FIG. 14 is a cross section of an armature core made of powdered iron.
Figure 15:
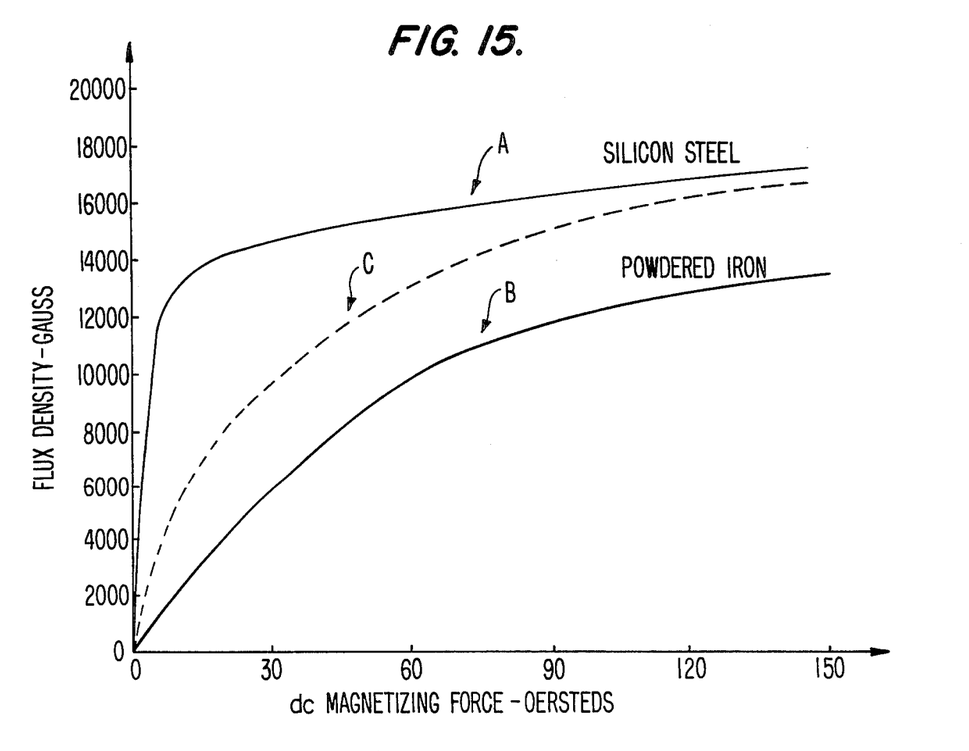
FIG. 15 is a graph illustrating the difference in flux density between an armature core made of silicon steel and an armature core made of powdered iron.

Applicant has found that eddy current losses can be greatly reduced by forming the core of powdered iron. A powdered iron core consist of fine (small) iron particles insulated and compressed and held together by a binder material. A cross-section of a core formed with powdered iron is shown in FIG. 14, with reference 140 illustrating the particles of iron and reference 141 illustrating the binding material. The insulation of particles is also enhanced by an oxide coating formed on each particle. Thus, there is a relatively high electrical resistance between particles. An armature core of this construction results in a reduction of eddy currents because the high electrical resistance between particles greatly reduces the eddy current flow area. However, a core made of powdered iron has a lower permeability and a lower maximum flux density than a conventional core made of silicon steel. A comparison between a core made of powdered iron and a core made of silicon steel is shown in FIG. 15. Thus, there is a trade off between a reduction in eddy current losses and a corresponding reduction in the amount of torque the motor can produce. For motors which are required to produce high torque, a core made of powdered iron may not be usable. On the other hand, a core made of powdered iron is ideal for small low power motors.

Figure 16:
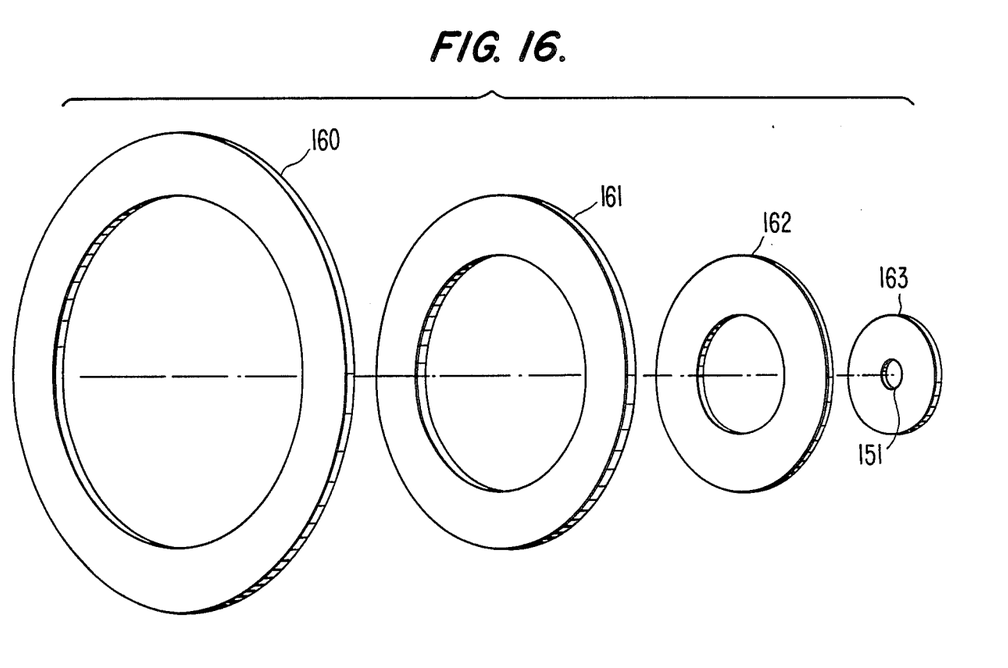
FIGS. 16 and 17 illustrate the construction of an armature core comprising a plurality of laminated sheets formed of a plurality of rings in accordance with the present invention.
Figure 17:
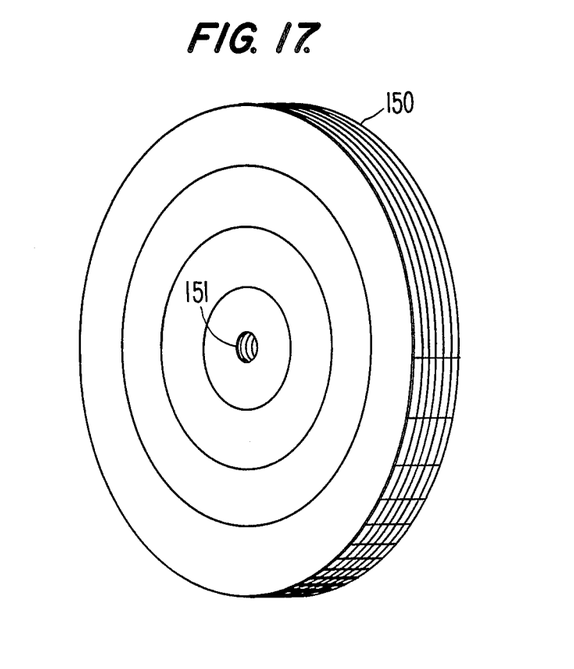

With reference to FIGS. 16 and 17, an armature core in accordance with the present invention will be described. In this embodiment, the core comprises a plurality of metal sheets 150. Each sheet comprises a plurality of rings 160-163 of silicon steel as shown in FIG. 16. The number of sheets 150 and rings 160-163 should be as large as practical, depending on the size and desired torque of the motor. Ring 163 also has hole 151 for an armature shaft.

Each of rings 160-163 is coated with a thin insulating material such as epoxy resin. Thus, each ring is electrically insulated.

Figure 18:
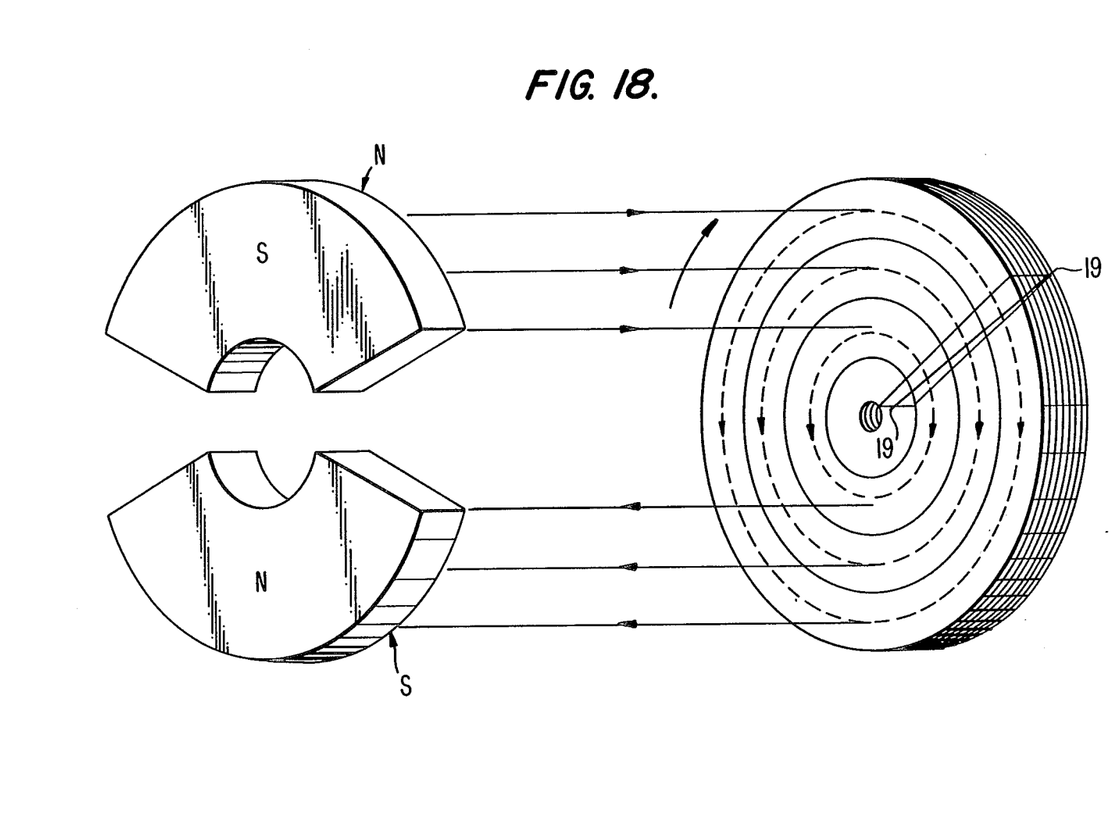
FIG. 18 illustrates the formation of north and south poles in the armature core shown in FIGS. 16 and 17.
Figure 19:
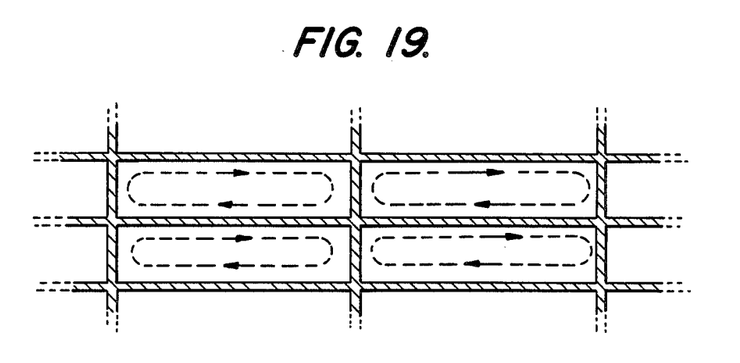
FIG. 19 is an illustration of the flow of eddy current due to the flow of magnetic flux circumferentially around the armature core shown in FIGS. 16 and 17.
Figure 20:
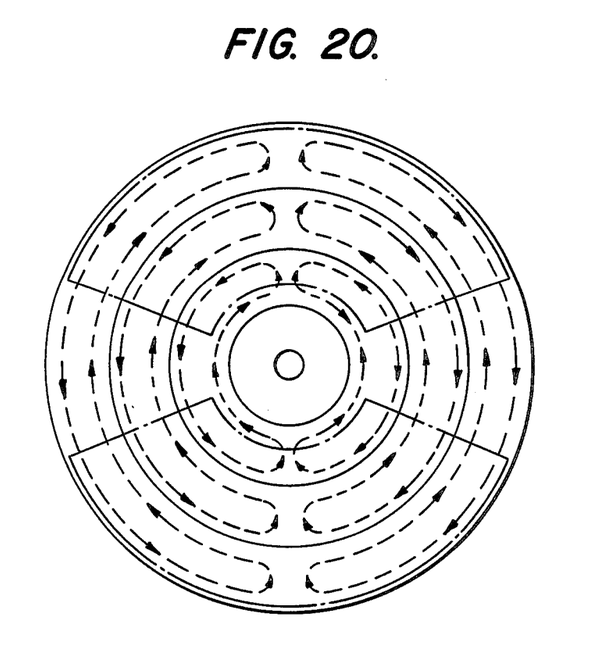
FIG. 20 is an illustration of the flow of eddy current due to the flow of magnetic flux perpendicular to the armature core shown in FIGS. 16 and 17.

FIG. 18 illustrates the formation of the north and south poles of the core and the flow of magnetic flux. FIG. 19 illustrates the flow of eddy current due to the flow of magnetic flux circumferentially around the core. FIG. 20, on the other hand, illustrates the flow of eddy current due to the flow of magnetic flux perpendicular to the core.

It has been found that a core constructed in accordance with FIGS. 16 and 17 substantially reduces eddy current losses. Each ring and sheet of the core is in effect segmented and has a substantially high electrical resistance due to the narrow current path.

Figure 21:
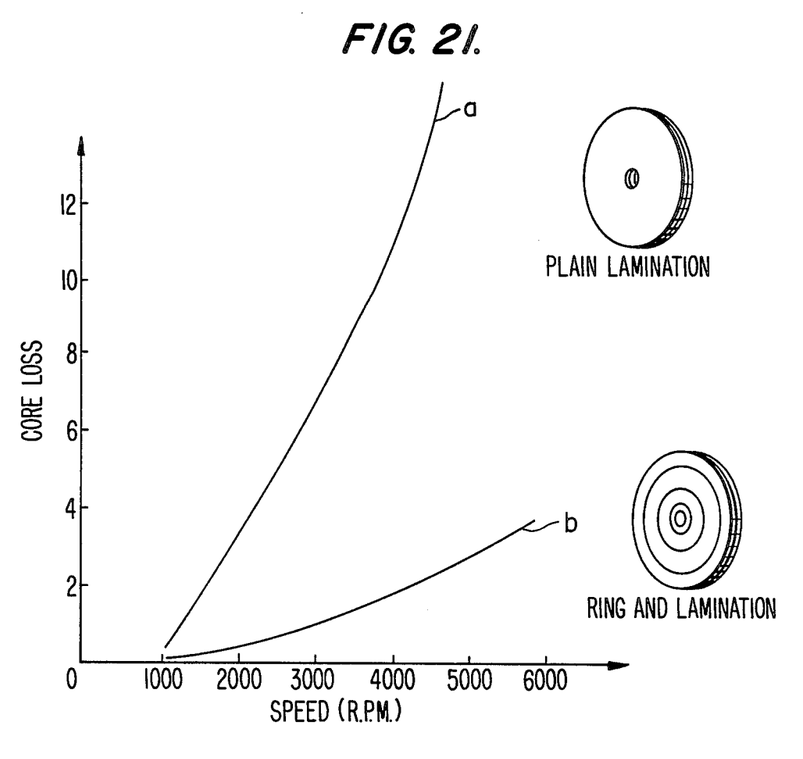
FIG. 21 is a graph illustrating the difference between eddy current losses for and armature core made of plain laminations and an armature core made of laminations where each sheet of the lamination is formed of a plurality of rings.

FIG. 21 is a graph illustrating eddy current losses for an armature core comprising a plurality of sheets (graph A) and an armature core comprising a plurality of sheets formed of rings or washers (B). As can be seen from the graph, there is a substantial reduction in eddy current losses when the armature core is fabricated with a plurality of rings in accordance with the present invention. Therefore, the graph shows that an armature core fabricated with laminated sheets having a plurality of rings provides an armature which effectively reduces eddy current flow and substantially increases the efficiency of the motor.

Figure 22:
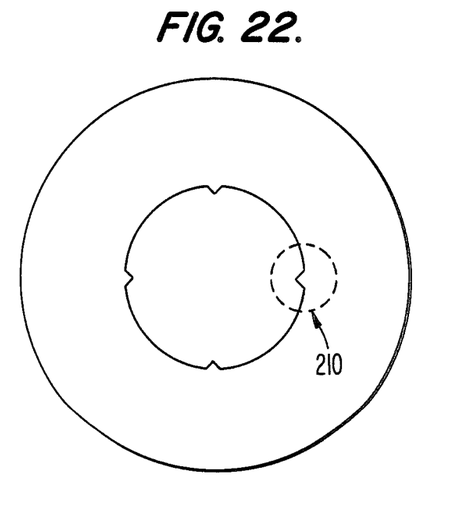
FIGS. 22 and 23 illustrate the locating tabs used to maintain a space between adjacent rings in the armature core shown in FIGS. 16 and 17.
Figure 23:
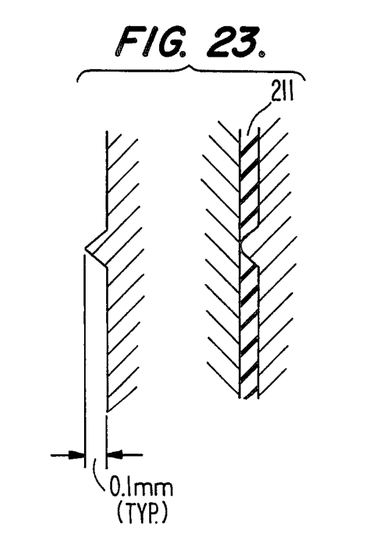

FIG. 22 illustrates one of rings 160-163 in greater detail. Each ring is provided with a plurality of locating tabs 210. The locating tabs maintainer a minimum gap between adjacent rings which are then filled with a resin material which serves as an adhesive to bind the rings together into a unified sheet and to bind the sheets together into a unified structure. FIG. 23 illustrates space 211 which is formed between adjacent rings due to the presence of tab 210. As can be seen in FIG. 23, space 211 is filled with resin as mentioned above. In addition, the complete armature core can be molded over with resin, ensuring that resin completely fills space 211.

Figure 24:
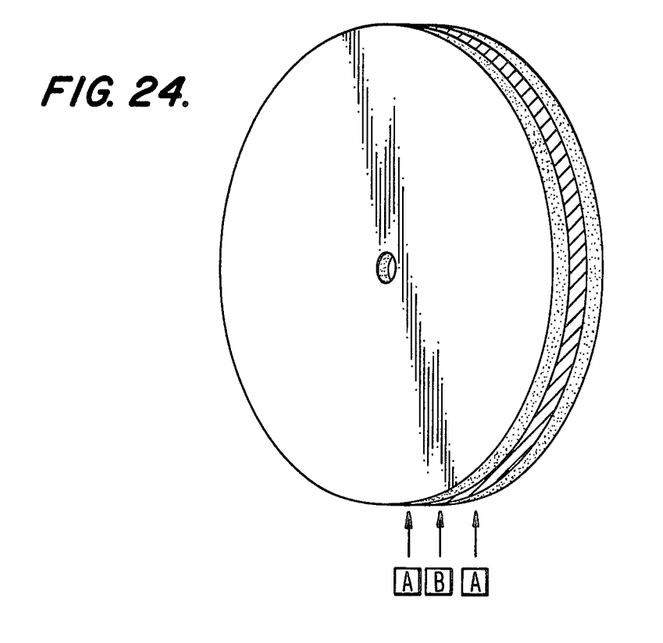
FIGS. 24–27 illustrate a further embodiment of the armature core of the present invention.
Figure 25:
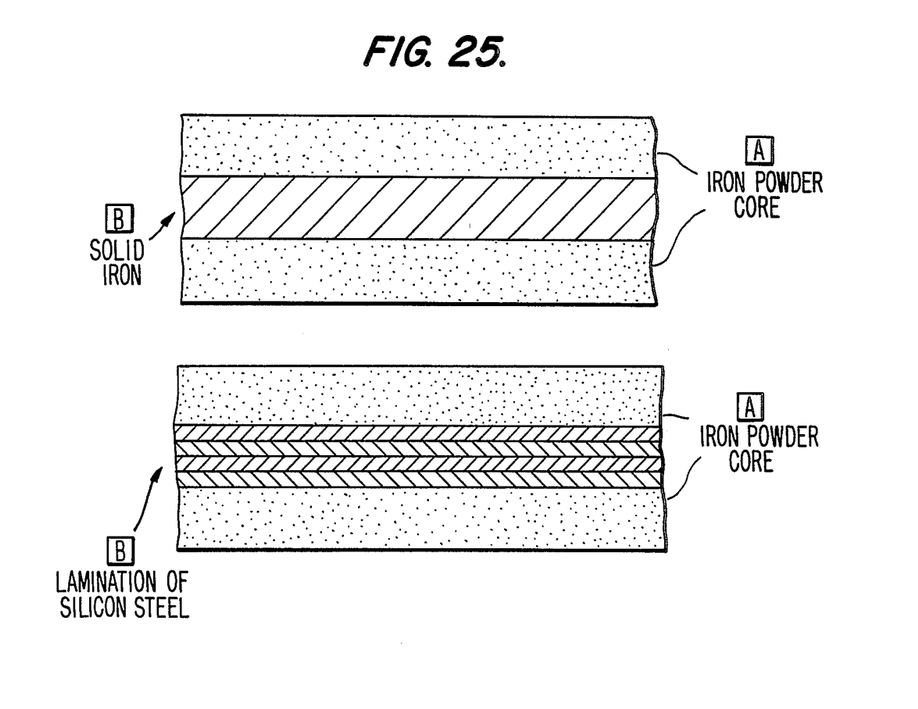
Figure 26:
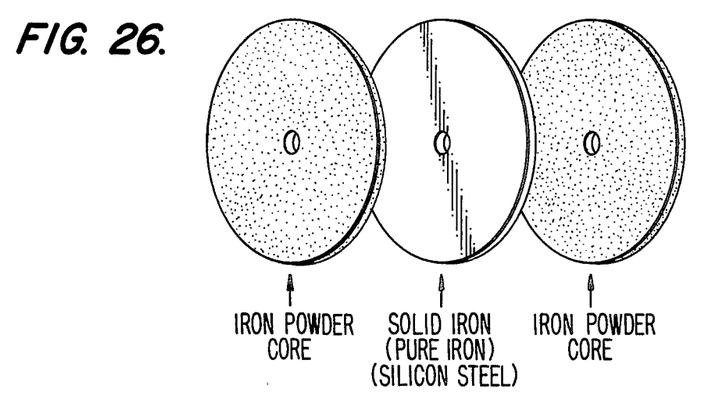
Figure 27:
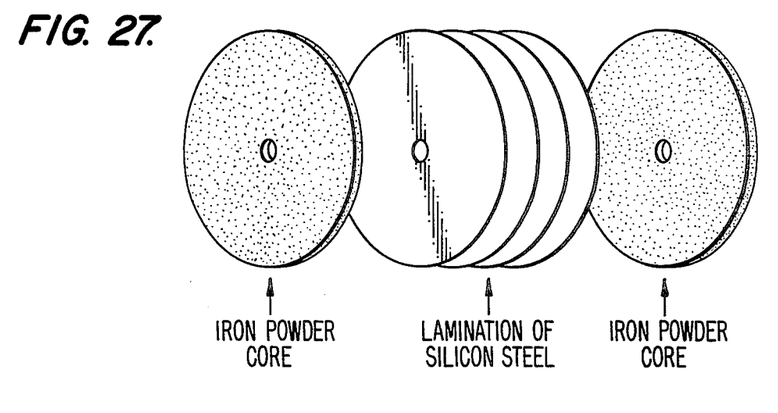

A further embodiment of an armature core is shown in FIGS. 24 and 25. This embodiment comprises a plurality of sheets of silicon steel separated by sheets of powdered iron. FIGS. 26 and 27 illustrate two embodiments of this construction. In FIG. 26, the plurality of laminated sheets comprises a first powdered iron sheet and a first powdered iron sheet located at front and rear faces of the armature core and a first solid iron sheet located between the powdered iron sheets with a space therebetween. The space is filled with resin. In FIG. 27, the armature core comprises a first powdered iron sheet located at front and rear faces of the armature core and a first series of laminations of solid iron sheets located between the powdered iron sheets with a space therebetween. The space is filled with resin.

Figure 28:
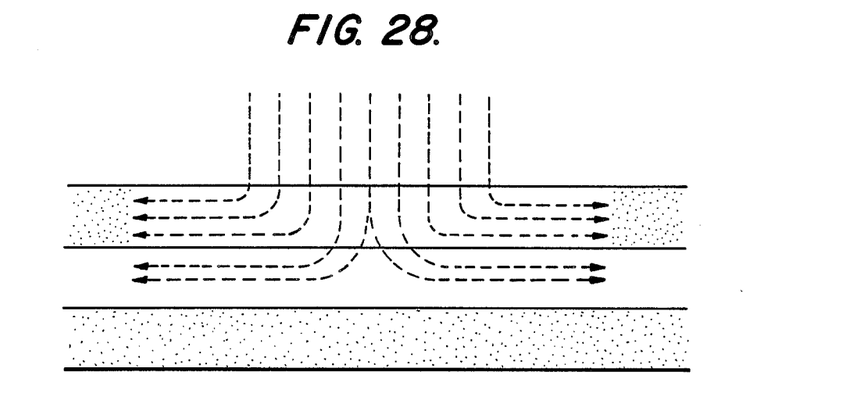
FIG. 28 illustrates the flow of magnetic flux through the armature core shown in FIGS. 24–27.

FIG. 28 is an illustration of the flow of the magnetic flux perpendicular to the armature core. In has been found that by reducing the percentage of magnetic flux flowing perpendicular to the armature core, substantially reduces eddy current losses. Correspondingly, the eddy current loss due to the flow of magnetic flux circumferentially around the armature core is greatly reduced, because the thickness of the sheets is very thin.

It has also been found that the embodiment of the armature core shown in FIGS. 24–27 has higher permeability and maximum flux density than a core made entirely of powdered iron as shown by curve C in FIG. 15. Therefore, this embodiment of the invention can be used where high torque output of the motor is desired.

Obviously, many modifications and variations of the abovedescribed preferred embodiment will become apparent to those skilled in the art from a reading of this disclosure. It should be realized that the invention is not limited to the particular apparatus disclosed, but its scope is intended to be governed only by the scope of the appended claims.

I claim:

1. An armature core for a direct current motor, said core comprising:
    a plurality of laminated sheets, each sheet being formed of at least two coplanar and concentrically interfitting component parts with a space therebetween, said component parts being made of magnetic material and being washer shaped in construction, said space being filled with a first insulating material.

2. The armature core of claim 1 wherein at least one of said component parts has spacing means for maintaining said space.

3. The armature core of claim 1 wherein said insulating material is a resin.

4. The armature core of claim 1 wherein said component parts are formed from silicon steel.

5. The armature core of claim 1 wherein said component parts are coated with a second insulating material.

6. The armature core of claim 5 wherein said second insulating material is a resin.

7. The armature core of claim 1 wherein said plurality of laminated sheets are encapsulated in a molding compound.

8. An armature core for a direct current motor, said core comprising:
    a plurality of laminated sheets, each sheet being formed of at least two interfitting component parts with a space therebetween, said component parts being made of magnetic material and being washer shaped in construction, said space being filled with a first insulating material, wherein said plurality of laminated sheets comprises at least one sequence of a first sheet formed of iron powder and a second sheet formed of solid iron adjacent said first sheet.

9. An armature core for a direct current motor, said core comprising:
    a plurality of laminated sheets, each sheet being formed of at least two interfitting component parts with a space therebetween, said component parts being made of magnetic material and being washer shaped in construction, said space being filled with a first insulating material, wherein said plurality of laminated sheets comprises at least one sequence of a first sheet formed of iron powder and a plurality of second sheets formed of solid iron adjacent said first sheet.

10. A low profile electric motor, said motor comprising:
    an armature core having front and rear faces, each of said faces having a plurality of armature windings which terminate in first and second free ends, said armature core including a plurality of laminated sheets, each sheet being formed of at least two coplanar and concentrically interfitting component parts with a space therebetween, said component parts being made of magnetic material and being washer shaped in construction, said space being filled with a first insulating material;
    an armature shaft rigidly received through a hole formed in the center of said armature core;
    commutator means positioned on said shaft adjacent one of said plates and operatively connected to said first and second free ends for intermittently supplying a power source to a selected one of said windings; and
    brush means operatively coupled to said commutator means for connecting said power source to said commutator.

11. A low profile electric motor, said motor comprising:
    an armature core having front and rear faces, each of said faces having a plurality of armature windings which terminate in first and second free ends, said armature core including a plurality of laminated sheets, each sheet being formed of at least two interfitting component parts with a space therebetween, said component parts being made of magnetic material and being washer shaped in construction, said air gap being filled with a first insulating material, wherein said windings substantially occupy a 120° segment of said armature core;
    an armature shaft rigidly received through a hole formed in the center of said armature core;
    commutator means positioned on said shaft adjacent one of said plates and operatively connected to said first and second free ends for intermittently supplying a power source to a selected one of said windings; and
    brush means operatively coupled to said commutator means for connecting said power source to said commutator.

12. The electric motor of claim 10 wherein said armature core includes a plurality of slots along its periphery, said windings being received in said slots.

13. An armature core for a DC motor, said core comprising:
    a plurality of laminated sheets made of magnetic material, first and second sheets of said plurality of sheets each having a relatively high electrical resistance and a first magnetic permeability and a first maximum flux density, a third sheet of said plurality of sheets being located between said first and second sheets and having a second magnetic permeability higher than said first permeability and a second maximum flux density higher than said first maximum flux density.

14. The armature core of claim 13 wherein said third sheet is separated from said first and second sheets by a space, said space being filled with a first insulating material.

15. The armature core of claim 13 wherein said plurality of laminated sheets includes a plurality of said third sheets.

16. The armature core of claim 15 wherein said third sheets are positioned adjacent each other.

17. The armature core of claim 13 wherein said first and second sheets are formed of iron powder.

18. The armature core of claim 13 wherein said third sheet is formed of solid iron.

19. The electric motor of claim 13 wherein said windings substantially occupy a 120° segment of said armature.

20. The electric motor of claim 13 wherein said armature core includes a plurality of slots along its periphery, said windings being received in said slots.

21. A low profile motor, said motor comprising:

an armature core having a plurality of laminated sheets made of magnetic material, first and second sheets of said plurality of sheets each having a relatively high elctrical resistance and a first magnetic permeability and a first maximum flux density, a third sheet of said plurality of sheets being located between said first and second sheets and having a second magnetic permeability higher than said first permeability and a second maximum flux density higher than said first maximum flux density;

an armature shaft rigidly received through a hole formed in the center of said armature core;

commutator means positioned on said shaft adjacent one of said plates and operatively connected to said first and second free ends for intemittently supplying a power source to a selected one of said windings; and brush means operatively coupled to said commutator means for connecting said power source of said commutator.

22. The electric motor of claim 21 wherein said windings substantially occupy a 120° segment of said armature.

23. The electric motor of claim 21 wherein said armature core includes a plurality of slots along its periphery, said windings being received in said slots.

* * * * *